US009197155B2

(12) United States Patent
Ishida et al.

(10) Patent No.: US 9,197,155 B2

(45) Date of Patent: Nov. 24, 2015

(54) TERMINAL PLATE CIRCUIT

(75) Inventors: Jun Ishida, Osaka (JP); Kenji Hamano, Osaka (JP)

(73) Assignee: ONAMBA CO., LTD. (JP)

( * ) Notice: Subject to any disclaimer, the term of this patent is extended or adjusted under 35 U.S.C. 154(b) by 1260 days.

(21) Appl. No.: 12/529,685

(22) PCT Filed: Aug. 25, 2008

(86) PCT No.: PCT/JP2008/002292

§ 371 (c)(1), (2), (4) Date: Sep. 2, 2009

(87) PCT Pub. No.: WO2009/084127

PCT Pub. Date: Jul. 9, 2009

(65) Prior Publication Data

US 2010/0110639 A1 May 6, 2010

(30) Foreign Application Priority Data

Dec. 28, 2007 (JP) ................................ 2007-339205

(51) Int. Cl.

*H02B 1/01* (2006.01)
*H02B 1/56* (2006.01)
*H05K 7/20* (2006.01)
*H02S 40/34* (2014.01)

(52) U.S. Cl.

CPC .................................. *H02S 40/345* (2014.12)

(58) Field of Classification Search

None

See application file for complete search history.

(56) References Cited

U.S. PATENT DOCUMENTS 4,139,881 A * 2/1979 Shimizu et al. ............... 361/760
5,842,275 A * 12/1998 McMillan et al. .............. 29/840
6,732,905 B2 * 5/2004 Humpston et al. ......... 228/124.6
7,144,648 B2 * 12/2006 Tawfik et al. ................. 429/535
7,948,001 B2 * 5/2011 Kamada et al. ................. 257/99
2004/0080042 A1 * 4/2004 Macomber et al. ........... 257/718

(Continued)

FOREIGN PATENT DOCUMENTS

JP 02-161736 6/1990
JP 07-202063 8/1995

(Continued)

OTHER PUBLICATIONS

WIPO (Japanese Patent Office), International Search Report for PCT/JP2008/002292 (4 pages).

(Continued)

*Primary Examiner* — Courtney Smith

(74) *Attorney, Agent, or Firm* — Kolisch Hartwell, P.C.

(57) ABSTRACT

In a terminal plate circuit in which the bottom surface of the diode is attached to the surface of the terminal plate with solder so as to dissipate the heat of the diode, heat transfer from the diode to the terminal plate is facilitated by removing the air bubbles in the solder during the soldering. A terminal plate circuit configured in such a manner that a metal part of a bottom surface of a diode of surface mounting type is soldered onto a surface of a terminal plate that is larger than the metal part, characterized in that streaks consisting of a plurality of lines that do not intersect with each other are formed on the surface of the terminal plate onto which the diode is to be soldered, whereby air bubbles generated within the solder during the soldering are let to escape from a lower surface of the diode to outside through the streaks. This terminal plate circuit is suitable for the use in a terminal box for solar cell panel.

5 Claims, 4 Drawing Sheets

(56) References Cited

U.S. PATENT DOCUMENTS

| | | | | |
|---|---|---|---|---|
| 2005/0148237 | A1* | 7/2005 | Nobori et al. | 439/607 |
| 2007/0001297 | A1* | 1/2007 | Higasa et al. | 257/723 |

FOREIGN PATENT DOCUMENTS

| | | |
|---|---|---|
| JP | 08-330486 | 12/1996 |
| JP | 2001-298134 | 10/2001 |
| JP | 2004-022615 | 1/2004 |
| JP | 2005-203703 | 7/2005 |
| JP | 2005-209971 | 8/2005 |
| JP | 2005-251962 | 9/2005 |
| JP | 2005-332869 | 12/2005 |
| JP | 2007-110031 | 4/2007 |

OTHER PUBLICATIONS

WIPO (Japanese Patent Office), International Preliminary Report on Patentablity for PCT/JP2008/002292 (5 pages).

* cited by examiner 10
10
12
12
14

16
10mm
16
16
DIRECTION
OF THE
GRAINS
17
17
17
1.6mm
6mm

TERMINAL PLATE CIRCUIT

TECHNICAL FIELD OF THE INVENTION

The present invention relates to a terminal plate circuit that is used in a severe environment such as in a terminal box for solar cell panel.

BACKGROUND ART

Figure 1:
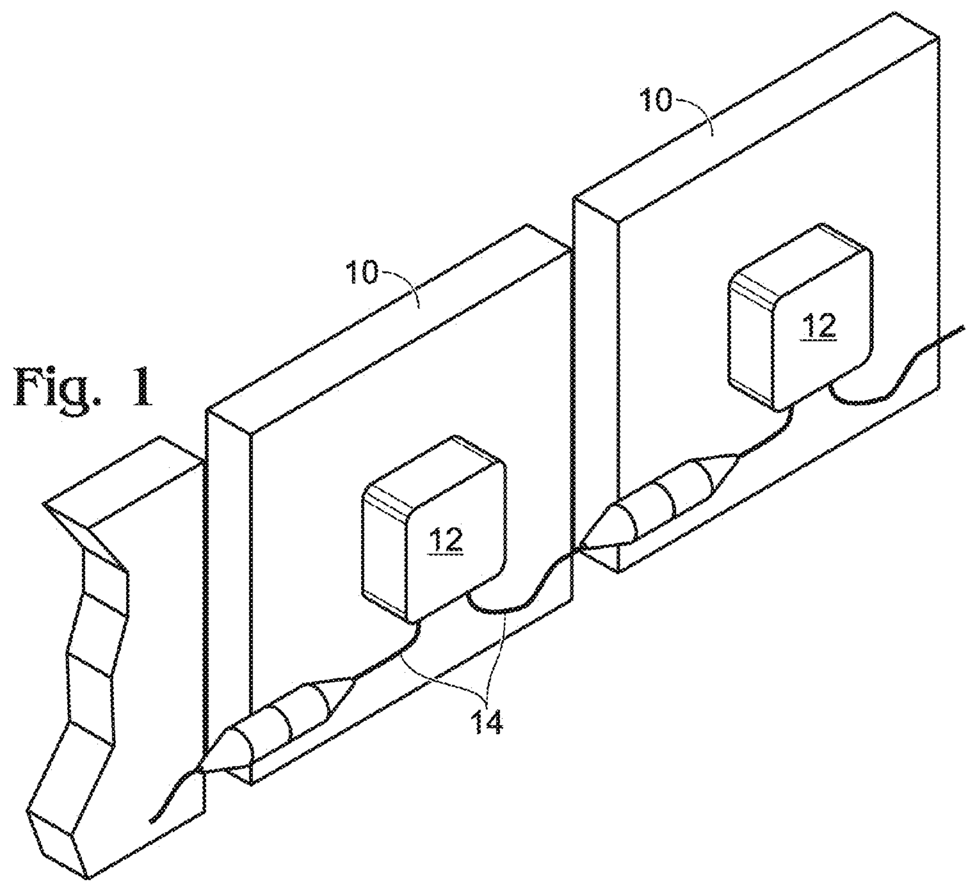

Description will be made by using as an example a terminal plate circuit within terminal boxes for solar cell panel that are arranged in a large number on a roof of a house or the like. FIG. 1 shows a schematic view of a rear surface of a solar cell panel. As is clear from FIG. 1, each solar cell panel 10 has a terminal box 12 mounted on a rear surface thereof. Terminal boxes 12 of adjacent solar cell panels 10 are electrically connected with each other via an external connection cable 14.

In the inside of the terminal box, a pair of terminal plates are mounted, one end thereof is connected to the external connection cable, and the other end thereof is connected to the electrode of the solar cell panel. Further, a diode is incorporated in the inside of the terminal box so as to connect the aforesaid pair of terminal plates with each other.

This diode is a bypass diode for short-circuiting the electric current, which is generated by application of an inverse-direction voltage when the electromotive force of the solar cell panel decreases, from one external connection cable to the other external connection cable. When the diode performs the aforementioned function, a large electric current flows in the forward direction of the diode, so that the diode generates heat violently, and the temperature thereof may exceed a proper operating temperature of the diode. In such cases, not only will the diode fail to function as a diode (heat burst) but also the diode and the surrounding circuit may have a fear of being broken. Further, even if they are not broken, the life of the diode will be extremely shortened when such a heat burst is repeated. Therefore, the generated heat must be efficiently dissipated so that the heat generated during the operation of the diode may not exceed a proper operating temperature of the diode.

As means for efficiently dissipating the heat generated by a diode, proposed is a terminal plate circuit in which a terminal plate is enlarged as much as possible within a terminal box, and the bottom surface of the diode is soldered onto the surface of the terminal plate so that the heat of the diode may be easily dissipated towards the terminal plate (cf. Japanese Patent Application Laid-Open (JP-A) Nos. 2005-251962 and 2007-110031).

However, when the bottom surface of the diode is soldered and attached to the surface of the enlarged terminal plate, air bubbles are mixed into the solder during the soldering, and the air bubbles lower the efficiency of heat transfer from the diode to the terminal plate, whereby the heat of the diode is not efficiently dissipated.

DISCLOSURE OF THE INVENTION

Problem that the Invention is to Solve

The present invention has been devised in view of the aforementioned problems of the related art, and an object thereof is to provide a terminal plate circuit in which heat transfer from the diode to the terminal plate is facilitated by removing or reducing the air bubbles in the solder during the soldering in a terminal plate circuit in which the bottom surface of the diode is attached to the surface of the terminal plate with solder so as to dissipate the heat of the diode.

Means for Solving the Problem

Namely, the present invention is a terminal plate circuit configured in such a manner that a metal part of a bottom surface of a diode of surface mounting type is soldered onto a surface of a terminal plate that is larger than the metal part, characterized in that streaks consisting of a plurality of lines (preferably straight lines) that do not intersect with each other are formed on the surface of the terminal plate onto which the diode is to be soldered, whereby air bubbles generated within the solder during the soldering are let to escape from a lower surface of the diode to outside through the streaks.

In a preferable embodiment of the terminal plate circuit of the present invention, a start point and an end point of each of the plurality of lines exist outside of the lower surface of the diode. In addition, in a preferable embodiment of the terminal plate circuit of the present invention, the plurality of lines constituting the streaks are parallel to grains of the surface of the terminal plate that have been formed when producing the terminal plate. In a preferable embodiment of the terminal plate circuit of the present invention, a depth of the streaks is 0.01 to 0.5 mm. Moreover, in a preferable embodiment of the terminal plate circuit of the present invention, the terminal plate is enlarged substantially in a planar manner, and the terminal plate circuit is used within a terminal box for solar cell panel.

Advantages of the Invention

In a terminal plate circuit of the present invention, air bubbles that are generated when a bottom surface of a diode is soldered onto a surface of a terminal plate are let to escape from a lower surface of the diode to outside by streaks that are formed on the surface of the terminal plate, so that heat of the diode can be efficiently transmitted to the terminal plate through the solder, and an effect of heat dissipation from the diode is extremely large. In particular, the terminal plate circuit of the present invention is highly suitable for the use in a severe environment such as in a terminal box for solar cell panel.

BRIEF DESCRIPTIONS OF DRAWINGS

FIG. 1 A schematic diagram showing a rear surface of a solar cell panel.

Figure 2:
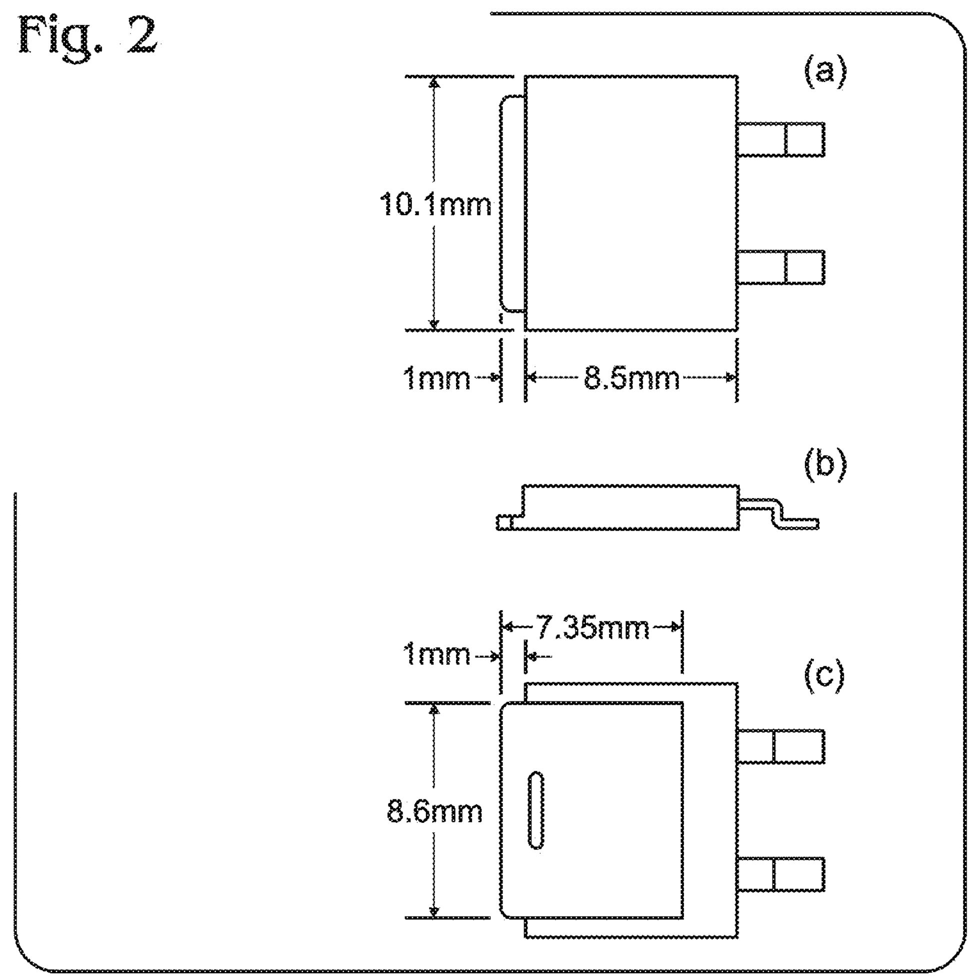

FIG. 2 One example of a diode of surface mounting type used in the present invention.

Figure 3:
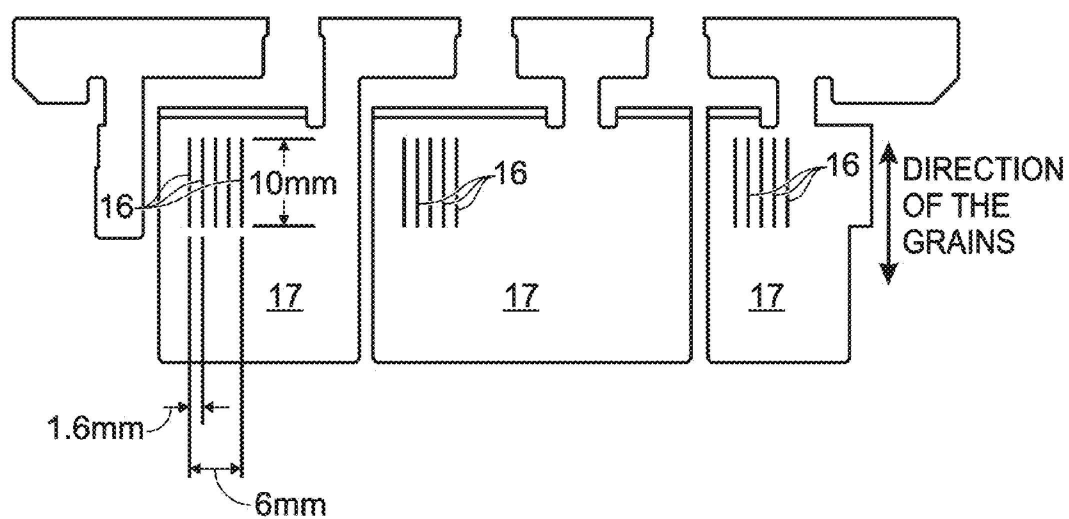

FIG. 3 A view showing a terminal plate having grains and streaks consisting of a plurality of straight lines that are parallel to the grains.

Figure 4:
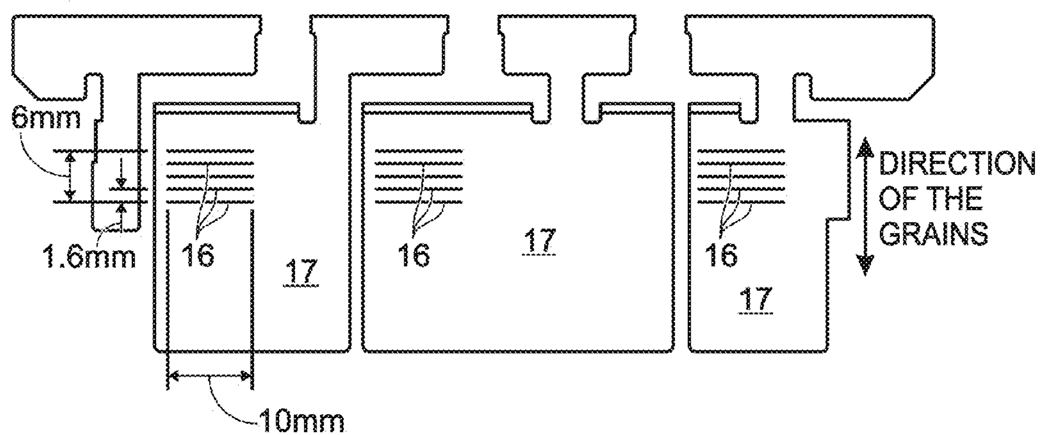

FIG. 4 A view showing a terminal plate having grains and streaks consisting of a plurality of straight lines that are perpendicular to the grains.

Figure 5:
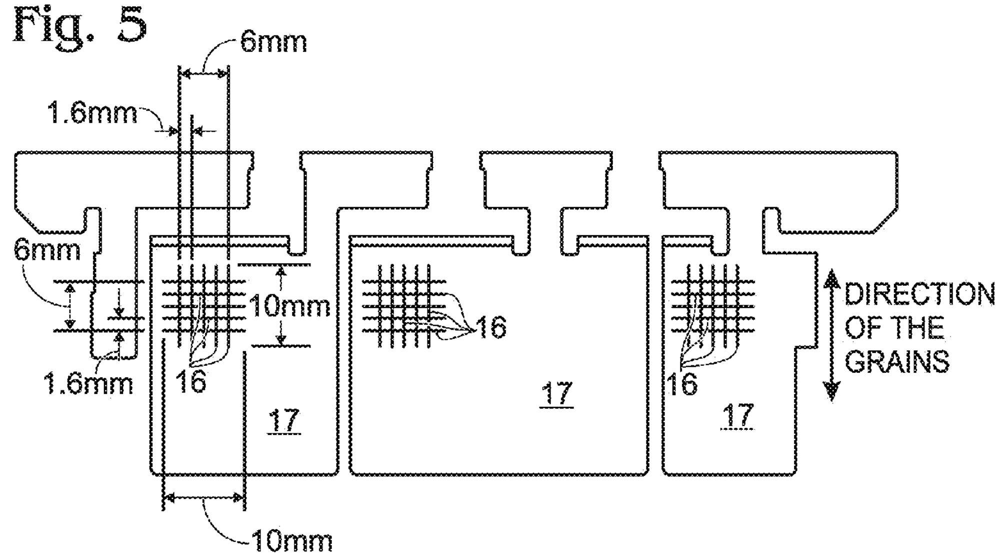

FIG. 5 A view showing a terminal plate having grains and grid-like streaks that are formed by intersections of a plurality of straight lines that are parallel to the grains and a plurality of straight lines that are perpendicular to the grains.

Figure 6:
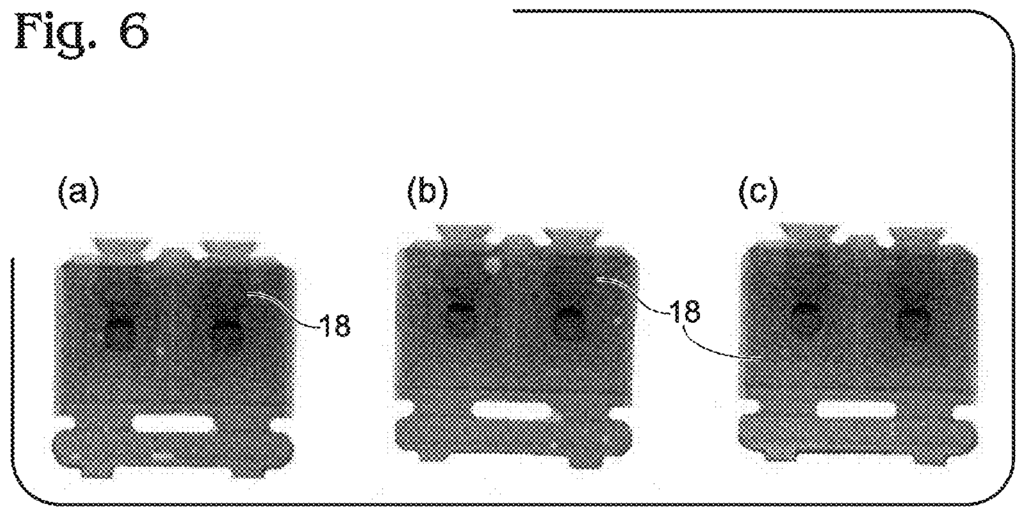

FIG. 6 An X-ray photograph showing a state of the solder on a lower surface of the diode when the diode is soldered onto the terminal plate of FIG. 3.

Figure 7:
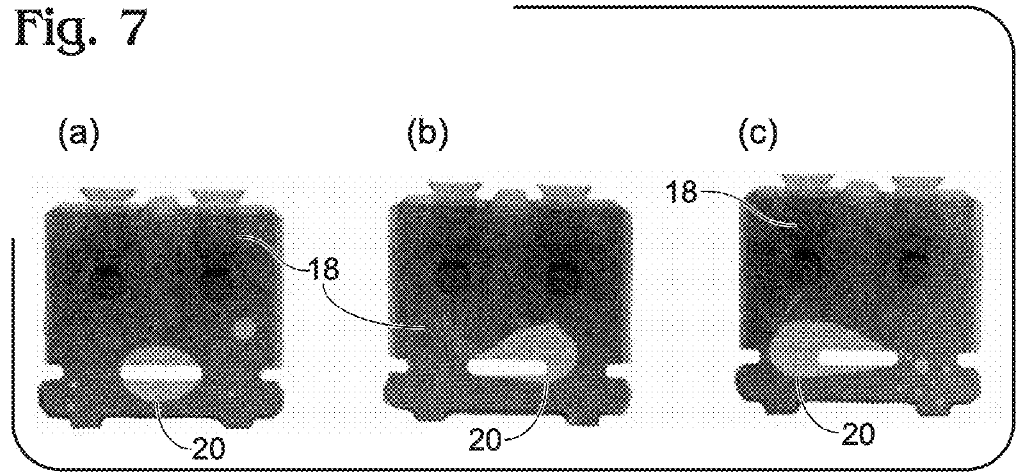

FIG. 7 An X-ray photograph showing a state of the solder on a lower surface of the diode when the diode is soldered onto the terminal plate of FIG. 4.

Figure 8:
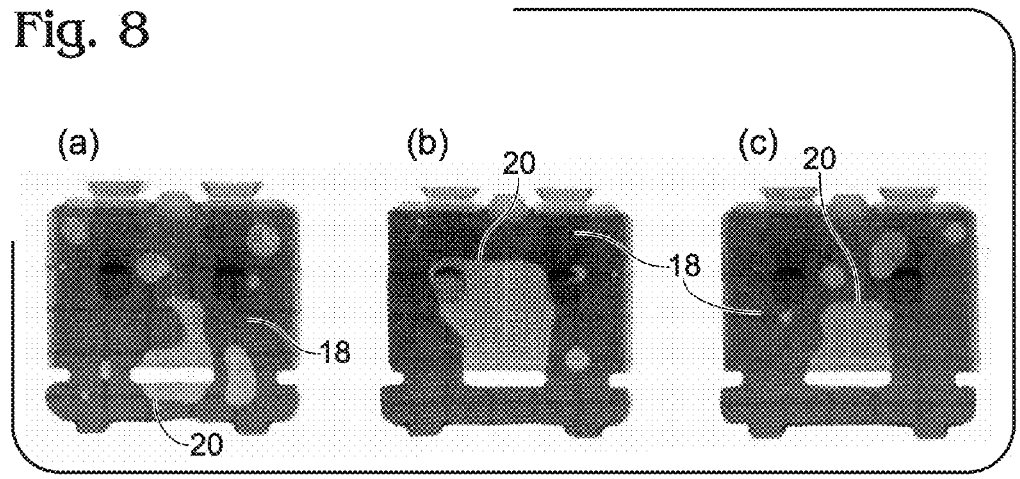

FIG. 8 An X-ray photograph showing a state of the solder on a lower surface of the diode when the diode is soldered onto the terminal plate of FIG. 5.

Figure 9:
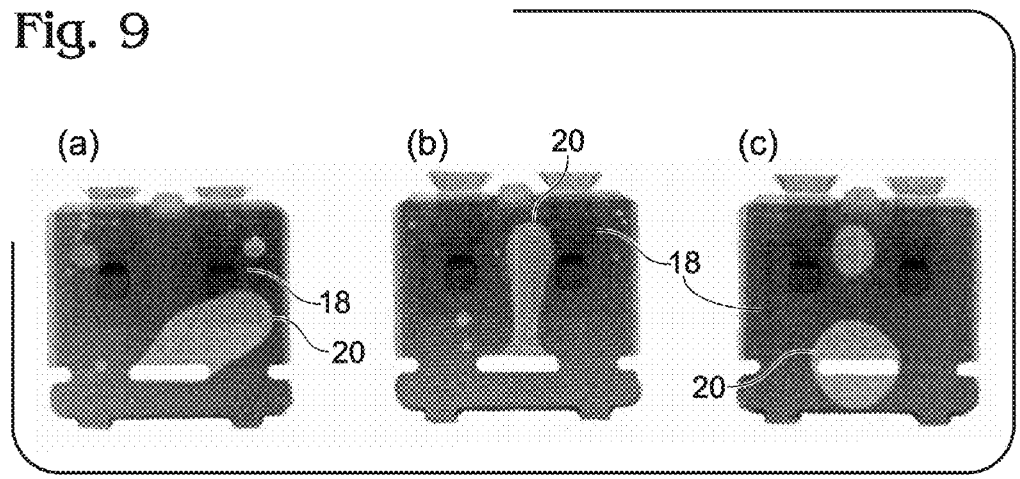

FIG. 9 An X-ray photograph showing a state of the solder on the lower surface of the diode when the diode is soldered onto the terminal plate having only the grains.

BEST MODE FOR CARRYING OUT THE INVENTION

The terminal plate circuit of the present invention will now be illustrated with reference to the drawings as follows, but the present invention is not limited thereto.

The terminal plate circuit of the present invention is configured in such a manner that a metal part of a bottom surface of a diode is soldered onto a surface of a terminal plate, so that heat generated by the diode may be transferred efficiently to the terminal plate.

In the present invention, a diode of surface mounting type is used. This is because, if the bottom surface does not have a metal part unlike in the diode of surface mounting type, the heat cannot be efficiently transferred from the bottom surface of the diode to the terminal plate through the solder. One example of the diode used in the present invention is shown in a plan view (a), a side view (b), and a bottom view (c) of FIG. 2. As will be clear from FIG. 2(*c*), a major part of the bottom surface of the diode is a metal part, and the heat is transferred from this part to the terminal plate through the solder.

In the present invention, a terminal plate having a surface larger than the metal part of the bottom surface of the diode is used. In order to obtain a high heat dissipation effect, the terminal plate is preferably enlarged as much as possible substantially in a planar manner within a terminal box. The main feature of the present invention is to form streaks on the surface of the terminal plate onto which the diode is to be soldered, whereby air bubbles generated within the solder during the soldering are let to escape from a lower surface of the diode to outside through the streaks. It is necessary that the streaks are constituted by a plurality of lines that do not intersect with each other. This is because, when an intersection is made in the streaks, air bubbles are liable to stay there. For this reason, each of the lines constituting the streak is preferably a straight line. Also, it is preferable that a start point and an end point of each of the plurality of lines constituting the streaks exist outside of the lower surface of the diode. With this configuration, the air bubbles within the solder that are generated at the lower surface of the diode easily move to the outside of the lower surface of the diode through the streaks. Generally, for the streaks, although it depends on a size of the metal part of the bottom surface of the diode, it is preferable that a plurality of (preferably three or more and ten or less) straight lines are formed in parallel at an interval of 0.5 mm to 3 mm so that they exist in a manner corresponding to the whole metal part of the bottom surface of the diode.

Moreover, in the present invention, the plurality of lines constituting the streaks are preferably parallel to the direction of the grains of the metal surface of the terminal plate that have been inevitably formed when producing the terminal plate. This is because, when the streaks and the grains intersect, air bubbles are liable to stay there. The grains are extremely fine streaks in a direction of a pressure roll that are formed during pressure-rolling of a plate-shaped object of aluminum alloy, copper, or the like, and are extremely minute (generally having a depth of around 0.0002 mm). In the present invention, the streaks that are formed on the surface of the terminal plate are different from the grains, and generally have a depth of 0.01 to 0.5 mm, preferably 0.05 to 0.3 mm. A cross section of the streak may be in any shape as long as the air bubbles can easily escape, and for example, a polygon such as a triangle or a quadrangle having an open top, or a combination of the polygon with a part of circle may be adopted.

One example of the terminal plate used in the present invention will be shown in FIG. 3. The terminal plate shown in FIG. 3 is enlarged in a planar manner larger than the bottom surface of the diode and, on the surface of the terminal plate to which the bottom surface of the diode is to be soldered, streaks 16 consisting of a plurality of straight lines are formed in parallel at an interval of 1.5 mm. Each of the lines constituting the streaks 16 is parallel to the direction of the grains 17 of the terminal plate. The terminal plate circuit is configured, for example, in such a manner that a pattern of the streaks 16 exists under the metal part of the bottom surface of the diode when the bottom surface of the diode of FIG. 2 (8.6×7.35 mm) is soldered onto the terminal plate and that a start point and an end point of each of the plurality of lines constituting the streaks 16 exist outside of the lower surface of the diode.

EXAMPLES

Terminal plates having grains 17 and streaks 16 consisting of a plurality of straight lines that are parallel to the grains as shown in FIG. 3, terminal plates having grains 17 and streaks 16 consisting of a plurality of straight lines that are perpendicular to the grains as shown in FIG. 4, terminal plates having grains 17 and grid-like streaks 16 that are formed by intersections of a plurality of straight lines that are parallel to the grains 17 and a plurality of straight lines that are perpendicular to the grains as shown in FIG. 5, and terminal plates having a configuration similar to that of FIG. 3 having grains 17 but without having streaks were respectively prepared in triplicate, and a metal part of a bottom surface of a diode of surface mounting type shown in FIG. 2 was soldered onto the surface of each terminal plate. Then, a photograph was taken with an X-ray (90 kV, 90 mA) from above the diode, and a state of generation of air bubbles within the solder was confirmed. For the terminal plates shown in FIGS. 3, 4 and 5, the diode was soldered in such a manner that a pattern of the streaks exists under the metal part of the bottom surface of the diode and that a start point and an end point of the streaks exist outside of the lower surface of the diode. For the terminal plate without having the streaks, the diode was soldered at a position similar to that of the example of FIG. 3.

FIGS. 6(*a*), 6(*b*), and 6(*c*) each show an X-ray photograph of the diode when the diode was soldered using the prepared three sheets of terminal plates of FIG. 3. FIGS. 7(*a*), 7(*b*), and 7(*c*) each show an X-ray photograph of the diode when the diode was soldered using the prepared three sheets of terminal plates of FIG. 4. FIGS. 8(*a*), 8(*b*), and 8(*c*) each show an X-ray photograph of the diode when the diode was soldered using the prepared three sheets of terminal plates of FIG. 5. FIGS. 9(*a*), 9(*b*), and 9(*c*) each show an X-ray photograph of the diode when the diode was soldered using the prepared three sheets of terminal plates without having the streaks.

As can be seen from FIGS. 6 to 9, although a lot of air bubbles 20 exist within the solder 18 in each of the terminal plate having only the grains without the streaks (FIG. 9) and the terminal plate having grains and grid-like streaks (FIG. 8), fewer air bubbles 20 exist in the solder 18 in the terminal plate having grains and unintersecting streaks (FIGS. 6 and 7) than in the above terminal plates. In particular, in the terminal plate having grains and straight-line streaks parallel to the grains (FIG. 6), almost no air bubbles exist in the solder 18, and it is assumed that an efficiency of heat transfer from the diode to the terminal plate through the solder is extremely high.

INDUSTRIAL APPLICABILITY

The terminal plate circuit of the present invention is suitable for the use in a severe environment such as in a terminal box for solar cell panel, because the heat generated by a diode can be efficiently transmitted to the terminal plate through the solder.

The invention claimed is:

1. A terminal box for a solar cell panel, including a terminal plate circuit configured in such a manner that a metal part of a bottom surface of a diode of surface mounting type is soldered onto a surface of a terminal plate that is larger than the metal part, characterized in that the surface of the terminal plate includes streaks consisting of a plurality of lines that do not intersect with each other such that the plurality of lines constituting the streaks are parallel to grains of the surface of the terminal plate, and the solder joining the bottom surface of the diode to the surface of the terminal plate is substantially free of air bubbles.

2. The terminal plate circuit according to claim 1 characterized in that a start point and an end point of each of the plurality of lines exist outside of the lower surface of the diode.

3. The terminal plate circuit according to claim 1 characterized in that the plurality of lines are straight lines.

4. The terminal plate circuit according to claim 1 characterized in that a depth of the streaks is 0.01 to 0.5 mm.

5. The terminal plate circuit according to claim 1 characterized in that the terminal plate is enlarged substantially in a planar manner.

* * * * *